United States Patent
Aviles, Jr. et al.

(10) Patent No.: US 11,693,772 B2
(45) Date of Patent: Jul. 4, 2023

(54) SYSTEM AND METHOD OF USING PERSISTENT MEMORY TO SUPPORT SMALL-SIZED DATA APPEND FOR OBJECT STORE

(71) Applicant: Samsung Electronics Co., Ltd., Suwon-si (KR)

(72) Inventors: Angel Benedicto Aviles, Jr., San Jose, CA (US); Vinod Kumar Daga, Santa Clara, CA (US); Vamsikrishna Sadhu, Santa Clara, CA (US); Venkata Bhanu Prakash Gollapudi, Pleasanton, CA (US); Vijaya Kumar Jakkula, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/810,833

(22) Filed: Mar. 5, 2020

(65) Prior Publication Data
US 2021/0209019 A1    Jul. 8, 2021

Related U.S. Application Data

(60) Provisional application No. 62/958,699, filed on Jan. 8, 2020.

(51) Int. Cl.
*G06F 12/06* (2006.01)
*G06F 1/26* (2006.01)

(52) U.S. Cl.
CPC .......... *G06F 12/0646* (2013.01); *G06F 1/263* (2013.01); *G06F 2212/1044* (2013.01)

(58) Field of Classification Search
None
See application file for complete search history.

(56) References Cited

U.S. PATENT DOCUMENTS

| 8,347,050 B2 | 1/2013 | Bernstein et al. |
| 9,075,710 B2 | 7/2015 | Talagala et al. |
| 10,558,567 B1 * | 2/2020 | Givargis ............. G06F 12/0276 |
| (Continued) | | |

OTHER PUBLICATIONS

Volos, Haris et al., "Mnemosyne: Lightweight Persistent Memory", ASPLOS'11, Mar. 5-11, 2011, pp. 91-103.

(Continued)

*Primary Examiner* — Ramon A. Mercado
*Assistant Examiner* — Marwan Ayash
(74) *Attorney, Agent, or Firm* — Renaissance IP Law Group LLP

(57) ABSTRACT

A system and a method are disclosed that efficiently supports an append operation in an object storage system. A size of data received with a request for an append operation from an application is determined based on a data-alignment characteristic of a storage medium. Data that is not aligned with the data-alignment characteristic is stored in persistent memory and aggregated with other data from the application that is not aligned with the data-alignment characteristic, while data that is aligned with the data-alignment characteristic is stored directly in the storage medium. Aggregated data that becomes aligned with the data-alignment characteristic as additional requests for append operations are received are migrated to the storage medium.

15 Claims, 2 Drawing Sheets

(56) References Cited

U.S. PATENT DOCUMENTS

| | | | |
|---|---|---|---|
| 2006/0036817 A1* | 2/2006 | Oza | G06F 9/3834 |
| | | | 711/155 |
| 2011/0252187 A1 | 10/2011 | Segal et al. | |
| 2014/0195480 A1 | 7/2014 | Talagala et al. | |
| 2016/0313919 A1 | 10/2016 | Chambliss et al. | |
| 2018/0113804 A1* | 4/2018 | Hsu | G06F 3/0673 |
| 2018/0275916 A1 | 9/2018 | Marinescu | |
| 2020/0034079 A1* | 1/2020 | Li | G06F 3/0659 |
| 2020/0097406 A1* | 3/2020 | Ou | G06F 12/0804 |
| 2020/0334292 A1* | 10/2020 | Gan | G06F 3/0679 |

OTHER PUBLICATIONS

Extended European Search Report for Application No. 20175154.2, dated Nov. 19, 2020.
European Office Action for Application No. 20175154.2, dated Dec. 15, 2022.

* cited by examiner

SYSTEM AND METHOD OF USING PERSISTENT MEMORY TO SUPPORT SMALL-SIZED DATA APPEND FOR OBJECT STORE

CROSS-REFERENCE TO RELATED APPLICATION

This application claims the priority benefit under 35 U.S.C. § 119(e) of U.S. Provisional Application No. 62/958,699, filed on Jan. 8, 2020, the disclosure of which is incorporated herein by reference in its entirety.

TECHNICAL FIELD

The subject matter disclosed herein relates to object storage systems. More specifically, the subject matter disclosed herein relates to a system and a method that efficiently supports an append operation in an object storage system.

BACKGROUND

An append operation is a common operation for an object storage device. Typical object storage devices provide some round-about or work-around techniques that approximate an append operation, but such object storage devices generally do not have a native and efficient way of supporting an append operation. One technique that is used for an append operation is a read-modify-write operation, which may be a costly and time consuming storage-media access technique.

FIG. 1 pictorially depicts an append operation 100 that is essentially a read-modify-write operation. At 101, an original object is read from storage. At 102, new data is appended to the original object. At 103, the updated object is written back to storage.

Additionally, small write sizes, that is, a write size that is less than native block size of a storage media, are generally not handled efficiently by the storage media of an object storage device. Consequently, a large number of small-sized append operations that may be performed for a large number of small sized writes may actually increase latency and may wear the media of a storage device at a fast rate.

SUMMARY

An example embodiment provides an object storage system that may include a storage medium, persistent memory and a controller. The storage medium may include a data-alignment characteristic. The persistent memory may include non-volatile memory that is accessible in a random access, byte-addressable manner. The controller may be coupled to the storage medium and the persistent memory, and the controller may be configured to: receive data from an application for a append operation; determine a size a first portion of the data to be a size of the data divided by a first integer multiple of a size of the data-alignment characteristic of the storage medium in which the first integer multiple may be greater than 0; determine a size of a second portion of the data to be a remainder of the size of the data divided by the first integer multiple of the size of the data-alignment characteristic of the storage medium; store in the storage medium the first portion of the data based on the first integer multiple being greater than 0; stage in the persistent memory the second portion of the data based on a size of the second portion of the data being greater than 0 in which the second portion of the data may be staged in the persistent memory with other second portions of data received with previously received append operations; and store in the storage medium staged second portions of the data that collectively having a size that is a second integer multiple of the size of the data-alignment characteristic of the storage medium, the second integer multiple being greater than 0. In one embodiment, the controller may be further configured to: use a mapping table to indicate that the first portion of the data is stored in the storage medium based on the first integer multiple being greater than 0; and use the mapping table to indicate that the second portion of the data is stored in persistent memory based on the size of the second portion of the data being greater than 0.

An example embodiment provides an object storage system that may include a storage medium, persistent memory and a controller. The storage medium may include a data-alignment characteristic. The persistent memory may include non-volatile memory that is accessible in a random access, byte-addressable manner. The controller may be coupled to the storage medium and the persistent memory, and the controller may be configured to: receive first data from an application for a first append operation; determine a size a first portion of the first data to be a size of the first data divided by a first integer multiple of a size of the data-alignment characteristic of the storage medium in which the first integer multiple being greater than 0; determine a size of a second portion of the first data to be a remainder of the size of the first data divided by the first integer multiple of the size of the data-alignment characteristic of the storage medium; store in the storage medium the first portion of the first data based on the first integer multiple being greater than 0; stage in the persistent memory the second portion of the first data based on a size of the second portion of the first data being greater than 0; receive second data from the application for a second append operation that is subsequent to the first append operation; determine a size a first portion of the second data to be a size of the second data divided by a second integer multiple of a size of a data-alignment characteristic of the storage medium, the second integer multiple being greater than 0; determine a size of a second portion of the second data to be the size of the second data divided by the second integer multiple of the size of the data-alignment characteristic of the storage medium; store in the storage medium the first portion of the second data based on the second integer multiple being greater than 0; stage in the persistent memory the second portion of the second data based on a size of the second portion of the second data being greater than 0; and store in the storage medium the second portion of the first data and the second portion of the second data staged in the persistent memory that collectively having a size that is a third integer multiple of the size of the data-alignment characteristic of the storage medium, the third integer multiple being greater than 0.

An example embodiment provides a method to store data from an application in an object storage system using an append operation in which the method may include: receiving first data from the application for a first append operation; determining a size a first portion of the first data to be a size of the first data divided by a first integer multiple of a size of a data-alignment characteristic of the storage medium in which the first integer multiple may be greater than 0; determining a size of a second portion of the first data to be a remainder of the size of the first data divided by the first integer multiple of the size of the data-alignment characteristic of the storage medium; storing in the storage medium the first portion of the first data based on the first integer multiple being greater than 0; staging in a persistent memory the second portion of the first data based on a size of the second portion of the first data being greater than 0 in which the persistent memory may include non-volatile memory that is accessible in a random access, byte-addressable manner; receiving second data from the application for a second append operation that is subsequent to the first append operation; determining a size a first portion of the second data to be a size of the second data divided by a second integer multiple of a size of a data-alignment characteristic of the storage medium in which the second integer multiple may be greater than 0; determining a size of a second portion of the second data to be the size of the second data divided by the second integer multiple of the size of the data-alignment characteristic of the storage medium; storing in the storage medium the first portion of the second data based on the second integer multiple being greater than 0; staging in the persistent memory the second portion of the second data based on a size of the second portion of the second data being greater than 0; and storing in the storage medium the second portion of the first data and the second portion of the second data staged in the persistent memory that collectively having a size that is a third integer multiple of the size of the data-alignment characteristic of the storage medium, the third integer multiple being greater than 0.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
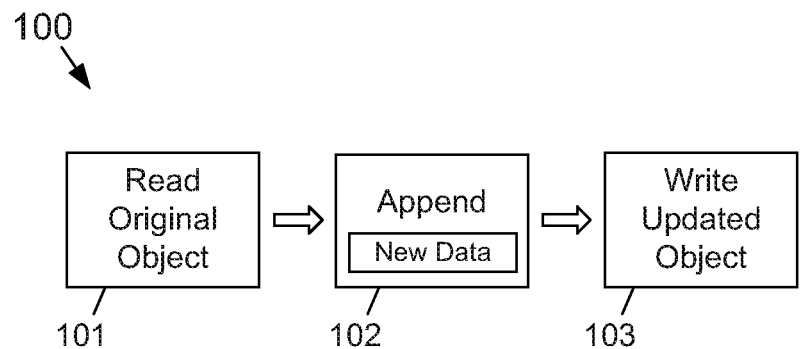
FIG. 1 pictorially depicts an append operation that is essentially a read-modify-write operation.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein provides an efficient way to support an append operation in an object storage device that avoids a read-modify-write operation. A size of data received with a request for an append operation from an application is determined based on a data-alignment characteristic of a storage medium. Data that is not aligned with the data-alignment characteristic is stored in persistent memory and aggregated with other data from the application that is not aligned with the data-alignment characteristic, while data that is aligned with the data-alignment characteristic is stored directly in the storage medium. Aggregated data that becomes aligned with the data-alignment characteristic as additional requests for append operations are received are migrated to the storage medium.

A table may be created that indicates where object data associated with an application is located. That is, the table may include locations in the storage medium and in the persistent memory where object data has been stored.

Figure 2:
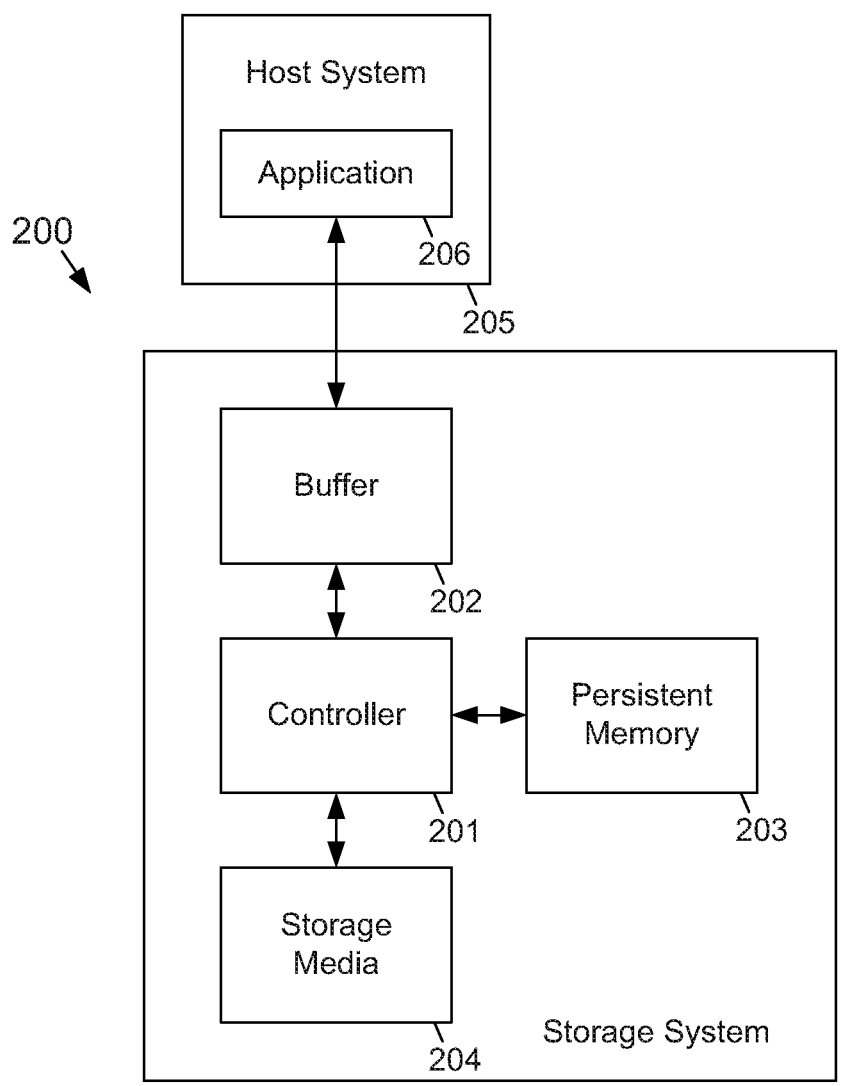
FIG. 2 depicts a block diagram of an object storage system that provides an efficient technique to support an append operation according to the subject matter disclosed herein.

FIG. 2 depicts a block diagram of an object storage system 200 that provides an efficient technique to support an append operation according to the subject matter disclosed herein. The object storage system 200 may include a controller 201, a data buffer 202, a persistent memory 203, and a storage media 204. The controller 201 is communicatively coupled to each of the data buffer 202, the persistent storage 203, and the storage media 204. The various components depicted in FIG. 2 for the object storage system 200 may be implemented as one or more modules.

The controller 201 may include, for example, at least one microprocessor, at least one digital signal processor, at least one microcontroller, or the like. There may be a memory (not shown) that is coupled to the controller 201 that may store command code to be used by the controller 201 or a user data.

The buffer 202 may be configured to receive data and commands from an application 206 executing in a host system 205, and send data and status information to the host system 205. Although only one application 206 has been depicted as executing in the host system 205, it will be understood that any number of applications 206 may be executing in the host system 205. Additionally, it will also be understood that more than one host system 205 may be communicatively coupled to the object storage device 200.

The persistent memory 203 may be non-volatile memory that is accessible in a random access, byte-addressable manner. In one example embodiment, the persistent memory 203 may be, for example, dynamic random access memory (DRAM) or static random access memory (SRAM) having a power supply provided with battery backup. In another example embodiment, the persistent memory 203 may be a nonvolatile (NV) dual inline memory module (DIMM). In still another embodiment, the persistent memory 203 may be a storage class memory (SCM). The persistent memory 203 provides persistent storage, for example, across a power-failure.

The storage media 204 may be a non-volatile mass-storage device, such as, but not limited to one or more solid-state drives (SSDs) and/or one or more hard drives (HDs). In one embodiment, the persistent memory 203 may be used by the controller 201 to store command code and/or user data that is used by the controller 201. The storage media 204 may have a native block size. In one embodiment, the native block size of the storage media may be 512 bytes.

In one embodiment, when the application 206 sends a request for an append operation and data associated with the append operation, the data buffer 202 receives the data. The controller 201 determines whether the size of data associated with the received append operation matches the native block size of the storage media 204. In one embodiment, the size of the received data is divided by the size of the native block size. The portion of the received data that has a size that is an integer multiple greater than 0 of the native block size is written directly into the storage media 204. Any remaining portion of the received data that has a size that is less than the size of the native block size (i.e., a remainder) is written to the persistent memory 203 for later storage into the storage media 204.

Small-sized append operations are aggregated, or staged, in the persistent memory 203, and a mapping entry in a table may be created for an object that may point to the address within the persistent memory 203. Once a portion of an object in the persistent memory 203 grows to be large enough to efficiently be written to the storage media 204 (i.e., is an integer multiple greater than 0 of the native block size of the storage media 204), then the object data in the persistent memory 203 may be migrated, or written, to the storage media 204 as a background operation. The mapping entry or entries in the table for the migrated data may be updated accordingly.

Figure 3:
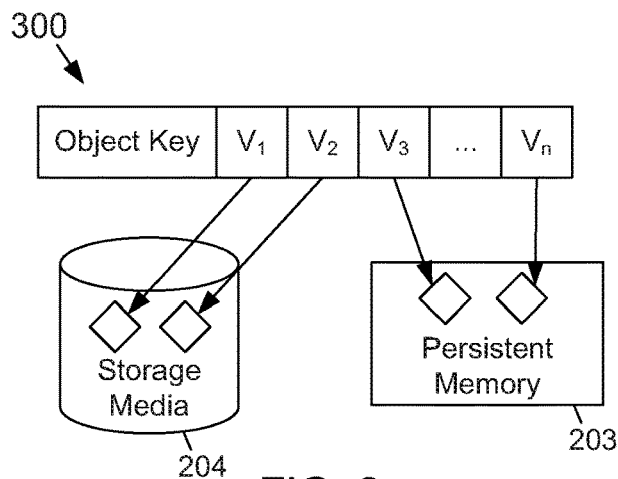
FIG. 3 depicts a portion of an example mapping table that may be created in, for example, the persistent memory that points to locations of the different portions of object data written to the object storage system by an application according to the subject matter disclosed herein.

FIG. 3 depicts a portion of an example mapping table 300 that may be created in, for example, the persistent memory 203 that points to locations of the different portions of object data written to the object storage system 200 by the application 206. That is, an object may be represented by a unique key that is able to point to multiple values, or locations, in the object storage system 200. Each value may represent a segment or portion of an entire object. A segment may either reside in the storage media 204 or in the persistent memory 203. For example, an object key may index values $V_1$ through $V_n$ of an object. As depicted in FIG. 3, the values $V_1$ and $V_2$ indicate locations in the storage media 204. The values $V_3$ and $V_n$ indicate locations in the persistent memory 203. During a read operation, the mapping entries for an object may be used to assemble the object from the various segments or portions.

Figure 4:
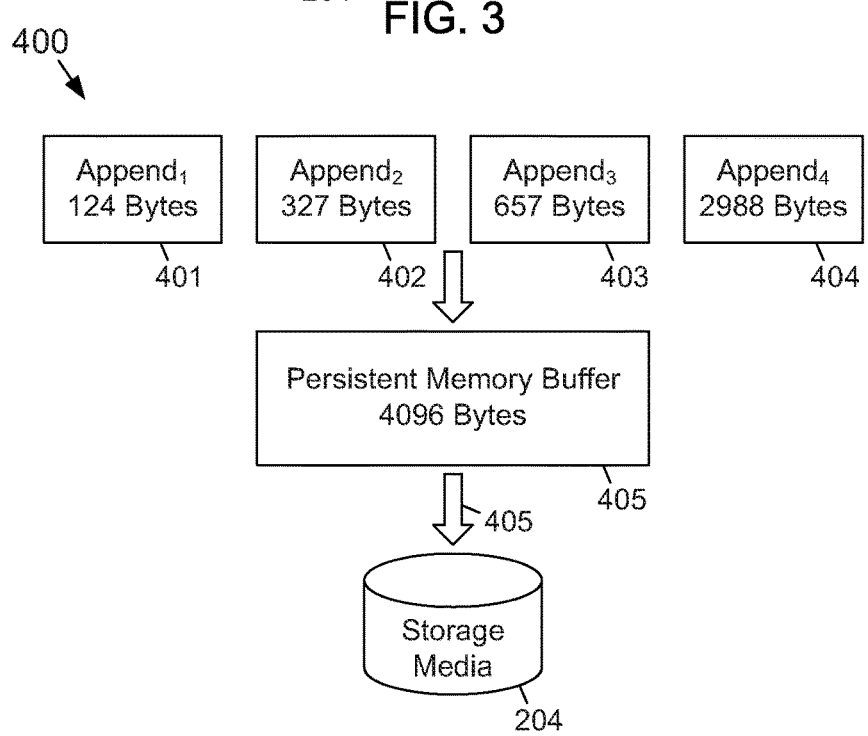
FIG. 4 pictorially depicts an example of multiple small append operations that are aggregated, or staged, in the persistent memory according to the subject matter disclosed herein.

FIG. 4 pictorially depicts an example 400 of multiple small append operations that are aggregated, or staged, in the persistent memory 203. Consider that the storage media 204 has a native block size of 512 bytes. At 401, a first append operation ($Append_1$) results in 124 bytes (a remainder) that are not byte aligned. The 124 bytes may be written into the persistent storage 203, and an entry created in a table (not shown) for the 124 byte object. For $Append_1$, (and also for $Append_2$ through $Append_4$) there may have also been data that was byte aligned and written directly into the storage media 204. Subsequently, at 402 a second append operation ($Append_2$) results in 327 bytes that are not byte aligned. The 327 bytes may be written into the persistent storage 203, and an entry created in the table (not shown) for the 327 byte object. A third and fourth append operations at 403 and 404 may be received that respectively result in 657 bytes and 2998 bytes being written into the persistent memory 203. At this point (at 405), the four example append operations $Append_1$-$Append_4$ have a collective byte total of 4096 bytes. The 4096 bytes are written to the storage media 204 at 406, and the corresponding entries for the four append operations $Append_1$-$Append_4$ are updated to indicate that the data that has been migrated to the storage media 204.

Figure 5:
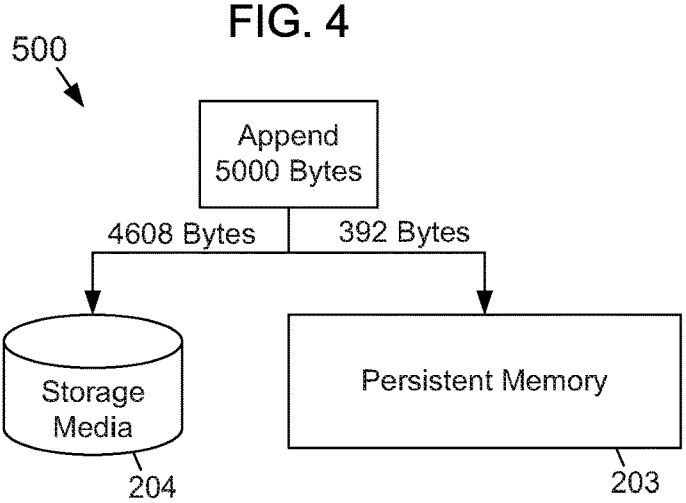
FIG. 5 pictorially depicts another example of an append operation according to the subject matter disclosed herein.

FIG. 5 pictorially depicts another example 500 of an append operation according to the subject matter disclosed herein. Consider an append operation of 5000 bytes and that the storage media 204 has a native block size of 512 bytes. The size of the data received with the append operation is divisible by the native block size of 512 with a remainder of 392 bytes. The portion of the data having a size of 4608 bytes is written directly into the storage media 204, and the remaining 392 bytes are written into the persistent memory 203. Entries are created in a table (not shown) to indicate a location of the 4608 bytes that are stored in the storage media 204, and to indicate a location for the 392 bytes that are stored in the persistent memory 203.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions recited in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. An object storage system, comprising:
   a storage medium comprising a data-alignment characteristic;
   persistent memory comprising non-volatile memory that is accessible in a random access, byte-addressable manner; and
   a controller coupled to the storage medium and the persistent memory, the controller being configured to:
   receive first object data for an object from an application for an append operation;
   determine a size of a first portion of the first object data based, at least in part, on a size of the first object data and a size of the data-alignment characteristic of the storage medium, wherein the first portion of the first object data represents a first segment of the object;
   determine a size of a second portion of the first object data based, at least in part, on a remainder of the size of the first object data and the size of the data-alignment characteristic of the storage medium, wherein the second portion of the first object data represents a second segment of the object;
   store, in the storage medium, the first portion of the first object data;
   stage, in the persistent memory, the second portion of the first object data based on a size of the second portion of the first object data being greater than 0, the second portion of the first object data being staged in the persistent memory with second object data, wherein the second object data represents a third segment of the object;
   store, in a mapping data structure in the persistent memory, an entry for the object, wherein the entry comprises:
   an object key,
   a first value,
   a second value, and a third value,
wherein the object key indexes the first value, the second value, and the third value, the first value indicates a location of the first portion of the first object data in the storage medium, the second value indicates a location of the second portion of the first object data in the persistent memory, and the third value indicates a location of the second object data in the persistent memory; and migrate, to the storage medium, the second portion of the first object data and the second object data, wherein the second portion of the first object data and the second object data collectively comprise a size that is based on the size of the data-alignment characteristic of the storage medium.

2. The object storage system of claim 1, wherein the persistent memory comprises random access memory having a power supply with battery backup.

3. The object storage system of claim 1, wherein the persistent memory comprises one of a non-volatile dual inline memory (NVDIMM) and a storage class memory (SCM).

4. The object storage system of claim 1, wherein the data-alignment characteristic is 512 bytes.

5. The object storage system of claim 1, wherein the storage medium comprises one of a solid-state drive (SSD) and a hard drive (HD).

6. An object storage system, comprising:
a storage medium comprising a data-alignment characteristic;
persistent memory comprising non-volatile memory that is accessible in a random access, byte-addressable manner; and
a controller coupled to the storage medium and the persistent memory, the controller being configured to:
receive first object data for an object from an application for a first append operation;
determine a size of a first portion of the first object data based, at least in part, on a size of the first object data and a size of the data-alignment characteristic of the storage medium, wherein the first portion of the first object data represents a first segment of the object;
determine a size of a second portion of the first object data based, at least in part, on a remainder of the size of the first object data and the size of the data-alignment characteristic of the storage medium, wherein the second portion of the first object data represents a second segment of the object;
store, in the storage medium, the first portion of the first object data;
stage, in the persistent memory, the second portion of the first object data based on a size of the second portion of the first object data being greater than 0;
receive second object data for the object from the application for a second append operation;
determine a size of a first portion of the second object data based, at least in part, on a size of the second object data and a size of a data-alignment characteristic of the storage medium, wherein the first portion of the second object data represents a third segment of the object;
determine a size of a second portion of the second object data based, at least in part, on the size of the second object data and the size of the data-alignment characteristic of the storage medium, wherein the second portion of the second object data represents a fourth segment of the object;

store, in the storage medium, the first portion of the second object data;
stage, in the persistent memory, the second portion of the second object data based on a size of the second portion of the second object data being greater than 0;
store, in a mapping data structure in the persistent memory, an entry for the object, wherein the entry comprises:
an object key,
a first value,
a second value, and
a third value,
wherein the object key indexes the first value, the second value, and the third value, the first value indicates a location of the first portion of the first object data in the storage medium, the second value indicates a location of the second portion of the first object data in the persistent memory, and the third value indicates a location of the second portion of the second object data in the persistent memory; and migrate, to the storage medium, the second portion of the first object data and the second portion of the second object data, wherein the second portion of the first object data and the second portion of the second object data collectively comprise a size that is based on the size of the data-alignment characteristic of the storage medium.

7. The object storage system of claim 6, wherein the persistent memory comprises random access memory having a power supply with battery backup.

8. The object storage system of claim 6, wherein the persistent memory comprises one of a non-volatile dual inline memory (NVDIMM) and a storage class memory (SCM).

9. The object storage system of claim 6, wherein the data-alignment characteristic is 512 bytes.

10. The object storage system of claim 6, wherein the storage medium comprises one of a solid-state drive (SSD) and a hard drive (HD).

11. A method comprising:
receiving first object data for an object from an application for a first append operation;
determining a size of a first portion of the first object data based, at least in part, on a size of the first object data and a size of a data-alignment characteristic of a storage medium, wherein the first portion of the first object data represents a first segment of the object;
determining a size of a second portion of the first object data based, at least in part, on a remainder of the size of the first object data and the size of the data-alignment characteristic of the storage medium, wherein the second portion of the first object data represents a second segment of the object;
storing, in the storage medium, the first portion of the first object data;
staging, in a persistent memory the second portion of the first object data based on a size of the second portion of the first object data being greater than 0, the persistent memory comprising non-volatile memory that is accessible in a random access, byte-addressable manner;
receiving second object data for the object from the application for a second append operation;
determining a size of a first portion of the second object data based, at least in part, on a size of the second object data and a size of a data-alignment characteristic of the storage medium, wherein the first portion of the second object data represents a third segment of the object;

determining a size of a second portion of the second object data based, at least in part, on the size of the second object data and the size of the data-alignment characteristic of the storage medium, wherein the second portion of the second object data represents a fourth segment of the object;

storing, in the storage medium, the first portion of the second object data;

staging, in the persistent memory, the second portion of the second object data based on a size of the second portion of the second object data being greater than 0;

storing, in a mapping data structure in the persistent memory, an entry for the object, wherein the entry comprises:
an object key,
a first value,
a second value, and
a third value,
wherein the object key indexes the first value, the second value, and the third value, the first value indicates a location of the first portion of the first object data in the storage medium, the second value indicates a location of the second portion of the first object data in the persistent memory, and the third value indicates a location of the second portion of the second object data in the persistent memory; and migrating, to the storage medium, the second portion of the first object data and the second portion of the second object data, wherein the second portion of the first object data and the second portion of the second object collectively comprise a size that is based on the size of the data-alignment characteristic of the storage medium.

12. The method of claim 11, wherein the persistent memory comprises random access memory having a power supply with battery backup.

13. The method of claim 11, wherein the persistent memory comprises one of a non-volatile dual inline memory (NVDIMM) and a storage class memory (SCM).

14. The method of claim 11, wherein the data-alignment characteristic is 512 bytes.

15. The method of claim 11, wherein the storage medium comprises one of a solid-state drive (SSD) and a hard drive (HD).

* * * * *